July 14, 1942. W. E. SHERMAN 2,290,001
BUMPER GUARD FOR CASTERS
Filed Dec. 24, 1941
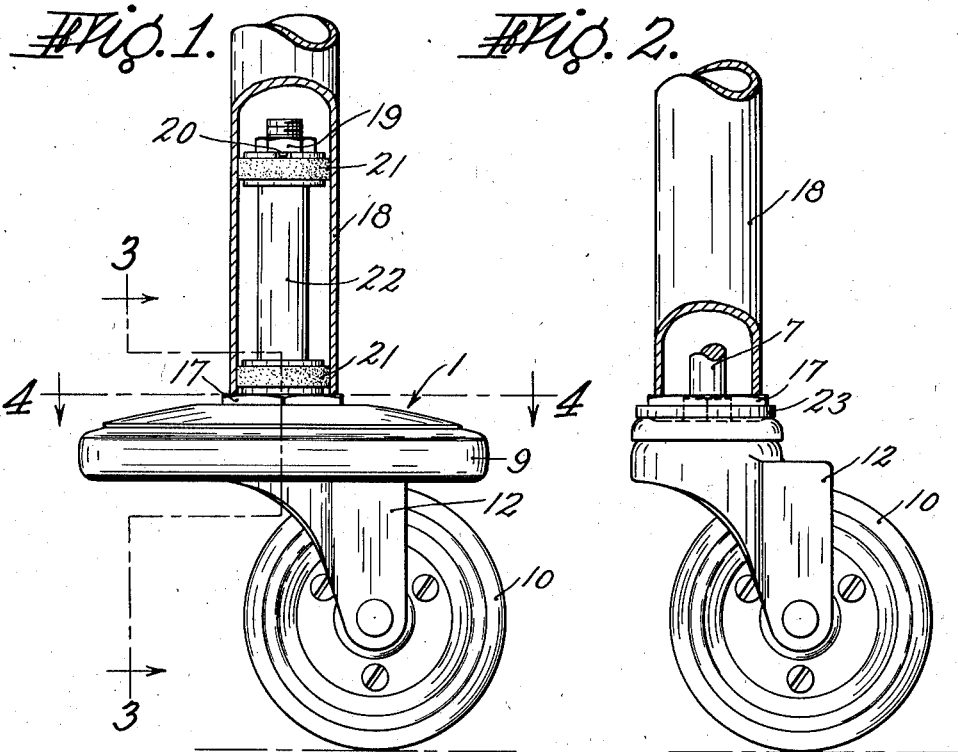
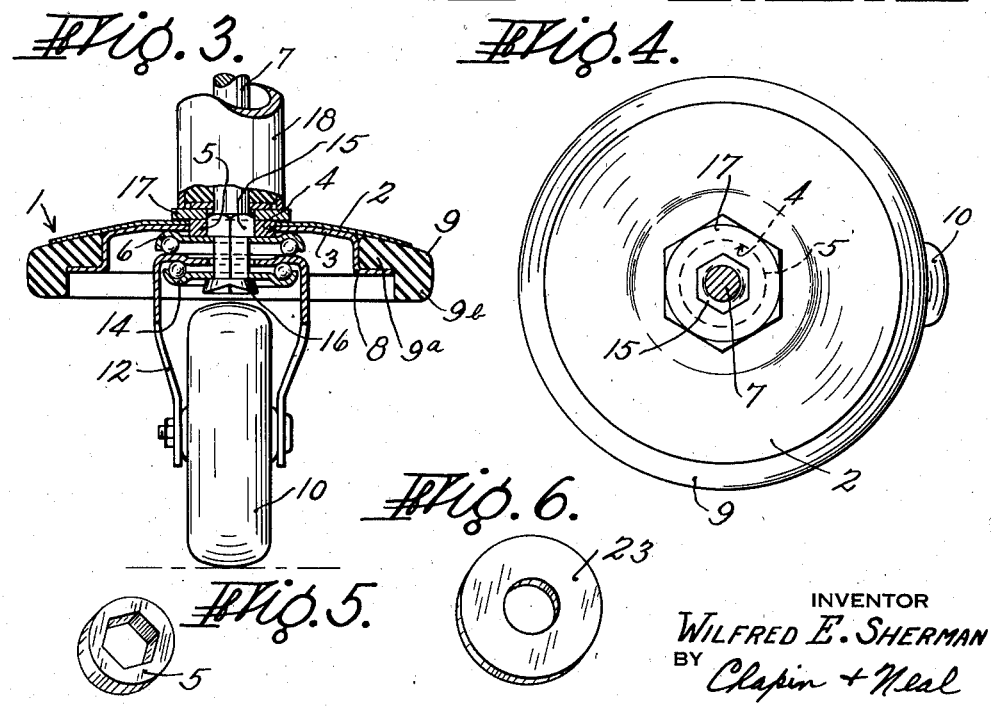
INVENTOR
WILFRED E. SHERMAN
BY Chapin + Neal
ATTORNEYS Patented July 14, 1942

2,290,001

UNITED STATES PATENT OFFICE 2,290,001

BUMPER GUARD FOR CASTERS

Wilfred E. Sherman, Palmer, Mass., assignor to Jarvis & Jarvis, Inc., Palmer, Mass., a corporation of Massachusetts Application December 24, 1941, Serial No. 424,331

3 Claims. (Cl. 45—137)

This invention relates to rolling bumper guard wheels for casters and the like. Such guard wheels are used extensively where it is desired to protect articles of furniture or walls from contact with the casters or legs of the article being moved about in a room. A conspicuous example of their use is seen in hospitals where beds and operating tables are generally so provided. A type of such prior art guard wheel is shown in Patent No. 1,888,726, granted November 22, 1932, to Jarvis et al.

An object of my invention is to improve the serviceability of such guard wheels by making a bumper that will contact the lowest of baseboards instead of the plaster walls, and further by making a sturdy wheel, the bumper portion of which may, when worn or deteriorated, be replaced with little effort and be as serviceable as the original bumper.

Another and principal object is to provide a bumper wheel of such construction that it may be mounted upon the usual caster without altering the height or elevation of the leg supported by said caster. In other words, my improved construction is so designed for combination with existing casters that it may be added to some of the legs of a table or bed without the necessity of equipping all four legs therewith, and that such partial installation will not alter in any way the level position of said table or bed. In many hospital beds for example, it would only be necessary to equip the legs next to the wall with the bumper wheels. Then if the bed were moved to a different position, bringing other legs against the wall, the bumper wheels could be easily shifted to the legs required and no further alterations would be necessary.

In the prior art, as for instance in the patented device above mentioned, the application of bumper wheel caster assemblies on two legs of a bed, where it was placed with its back or side against a wall, raised these legs higher than did ordinary casters. Hence it was necessary to cut down these legs to even up with the others having casters without roller guard wheels. And, as often happened, where it was desirable later to move the bed to another position in relation to the wall, it proved impractical to shift the bumpers since the legs required readjustment to fit the new arrangement. The new bumper wheel of my invention is designed to eliminate all such problems of rearrangement by adding no height to the assembly of an ordinary caster.

Other and further objects will appear in the following description accompanying the drawing, in which, Fig. 1 is a side elevation of the caster assembly with a bumper wheel;

Fig. 2 is a side elevation of a standard caster;

Fig. 3 is a view on line 3—3 of Fig. 1;

Fig. 4 is a view on line 4—4 of Fig. 1;

Fig. 5 is a perspective view of the hardened spacer bushing used in the assembly of Fig. 3; and Fig. 6 is a perspective view of a washer used in the standard caster of Fig. 2.

It will be appreciated from the above mentioned prior Jarvis patent that there is here provided a bumper guard wheel 1 of Fig. 1, having a smooth top surface convex in form and so constructed as to prevent the accumulation of dust, germs, or other deposits and to enable the wheel to be readily cleansed, and, in a hospital, easily disinfected.

Referring now more particularly to the drawing, the guard wheel indicated generally at 1 comprises a pair of superimposed disk plates, the upper one being indicated at 2 and the lower one at 3. These plates 2 and 3 are preferably of metal so as to be relatively thin and have a central hubless opening 4 through which the stem 7 of the caster extends, the opening 4 being preferably made large enough to fit around a hardened bushing 5. The opening 4 is made hubless so as to reduce the vertical space occupied by the central portions of said plates. The wheel 1 is loosely mounted for free rotation about the hardened bushing 5 and stem 7, and rides on the bearing surface provided by the raised peripheral edge of the bearing cup 6. The tightening nut 17 for expanding the caster applicator serves to retain said plates 2 and 3 as shown.

The central portion of lower plate 3 has its top surface in contact with plate 2 while the outer or rim portion is bent down and away from plate 2 in stepped formation at 8 to provide an annular socket between the two plates for the reception of a bumper tire 9. As shown in the drawing, Fig. 3, the annular socket formed at the rim portions of the plates 2 and 3 is wedge-shape in cross section with the wider portion of the wedge inwardly toward the center. The tire 9 is composed of rubber or similar material for a cushioned rolling contact of the wheel with a wall or some object. The inner or flange portion 9a of the tire is also wedge-shaped in cross section and fits snugly between the rim portions of the plates 2 and 3 so as to be firmly locked in position thereby. The outer or tread portion 9b of the tire overhangs the step 8 to provide a low bumping surface at its outer periphery. The outer top surface of the tire continues the sloping contour of the upper plate 2.

The plates 2 and 3 may or may not be welded together, as is desirable. It may be observed, however, that where the expectation is of extremely hard usage for the tire, it will be preferable to have the plates separable in order to replace it easily and with a comparatively tough tire material each time. The upper plate when removed will enable one to fit on a new tire merely by placing it on the step 8, while, if the plates are welded, the replacement tire will necessarily require a certain degree of elasticity in order to fit into the wedge-shaped annular socket.

The caster assembly on which the bumper wheel 1 is mounted comprises (Figs. 3 and 1) a wheel 10 mounted in caster fork 12, which is swiveled between ball bearing cups 14 and 6 secured to the lower end of caster stem 7 between a boss 15 and a rivet 16. Locked against rotation on the boss 15 is a hardened bushing 5 and above it a tightening nut 17 for detachably securing the assembly in a caster tube or sleeve 18 by rotating stem 7 therein and drawing a threaded lock nut 19 downwardly. Nut 19 is held against turning with the stem by a rib and recess connection 20 with an adjacent washer which is a part of one of the expanding elements 21 held apart on the stem by a spacer 22. Expanders 21 hold the assembly by frictional engagement within the walls of the tube. By drawing nut 19 downwardly the expanders are compressed and tightly engaged in the tube.

It will be noted in Fig. 3 that the two disk plates 2 and 3 together are of the thickness of an ordinary caster washer 23 (Fig. 6) so that the standard caster with the washer, in place of the bumper wheel as in Fig. 2, is the same height as the new assembly of Fig. 1. This standard caster is therefore readily convertible into an assembly with a bumper merely by the addition of bushing 5 and wheel 1 and the removal of the washer 23. It enables a hospital, for example, to purchase only the number of bumper guard wheels for its needs. These may be put on the desired number of legs and the assemblies shifted about and interchanged at will with ordinary casters.

I claim:

1. A bumper guard wheel for mounting on the vertical stem of a caster assembly, comprising a pair of relatively thin superimposed disk plates having a hubless center opening for receiving said stem, the upper plate having a convex top surface and the lower plate having its peripheral portion stepped down and away from said upper plate to thereby form between the rim portions of said plates an annular socket wedge-shaped in cross section, a bumper tire of resilient material having a flange portion of wedge-shaped cross section fitted snugly in the annular socket so as to be locked therein, said tire having its outer top surface extending in continuation of the convex contour of the upper plate, and a depending tread portion overhanging the peripheral edge of said lower plate.

2. A bumper guard wheel for rotatable mounting on the vertical stem of a caster assembly, comprising a pair of relatively thin superimposed disk plates spot welded together having a hubless center opening for receiving said stem, the upper plate having a convex top surface and the lower plate having its peripheral portion stepped down and away from said upper plate to thereby form between the rim portions of said plates an annular socket wedge-shaped in cross section, a bumper tire of resilient material having a flange portion of wedge-shaped cross section fitted snugly in the said annular socket so as to be locked therein, said tire having its outer top surface extending in continuation of the convex contour of the upper plate, and a depending tread portion overhanging the peripheral edge of said lower plate.

3. A bumper guard wheel for mounting on the vertical stem of a caster assembly, comprising a pair of relatively thin superimposed disk plates having a hubless center opening for receiving said stem, said disk plates resting upon the crown of the caster wheel fork and adapted for free rotation around said stem, the upper plate having a convex top surface and the lower plate having its peripheral portion stepped down and away from said upper plate to thereby form between the rim portions of said plates an annular socket wedge-shaped in cross section, a bumper tire of resilient material having a flange portion of wedge-shaped cross section fitted snugly in the said annular socket so as to be locked therein, said tire having its outer top surface extending in continuation of the convex contour of the upper plate, and a depending tread portion overhanging the peripheral edge of said lower plate.

WILFRED E. SHERMAN.